United States Patent Office 3,100,752
Patented Aug. 13, 1963

3,100,752
FLEXIBLE URETHANE FOAMS AND A PROCESS
FOR PRODUCING SAME
Bernard A. Dombrow, Teaneck, N.J., assignor to Nopco
Chemical Company, Harrison, N.J., a corporation of
New Jersey
No Drawing. Filed Nov. 26, 1957, Ser. No. 698,936
23 Claims. (Cl. 260—2.5)

This invention relates, in general, to flexible urethane foams. More particularly, the invention relates to a new and improved method for producing flexible foams of relatively low density from polyester prepolymers.

It is well known in the art that urethane foams are obtained by reacting a polyester resin with a polyisocyanate and water. Two reactions take place simultaneously when these reactants are mixed. In one, the polyisocyanate compound combines with the hydroxyl groups in the resin and with water to form macro molecules. In the other, the polyisocyanate compound and water react, liberating carbon dioxide gas. As the resin polymerizes, the liberated carbon dioxide gas is entrapped in the mass, expanding same and producing the cellular structure which is distinctive of urethane foams.

Either of two techniques are employed generally in the production of urethane foams. In the first, often referred to as the "one-shot method," the polyester resin, the polyisocyanate and water, and in some instances, an activator or a catalyst, are brought into intimate contact in a suitable vessel where, on mixing, they react exothermically to form the foamed product. The second technique involves the use of a so-called polyester prepolymer. Such a prepolymer is produced by reacting the polyester resin with an excess of polyisocyanate in the absence of water. A urethane foam will be obtained when the polyester prepolymer is reacted subsequently with water in the presence of an activator or a catalyst.

Obviously, both of the foregoing techniques are extremely valuable. However, the second technique, in addition to having certain advantages in and of itself, minimizes a disadvantageous feature of the first, namely, the necessity of storing and handling large quantities of the extremely toxic polyisocyanate compound. In the production of the prepolymer, much of the polyisocyanate is tied up by its reaction with the polyester resin chain. As a result, the hazards inherent in the storage and handling of the toxic polyisocyanate compound are, to some extent, minimized.

The second, or prepolymer, technique, however, is not without its attendant disadvantages. It is difficult quite often to blend the catalyst and water with the prepolymer. For obvious reason, any difficulty experienced in blending the components of the reaction mixture renders the process far less efficient than is desirable. In addition to this, however, inadequate blending of the components of the reaction mixture can lead to the production of foamed products which are characterized by rather large size and irregularly shaped cells. A further undesirable feature of the prepolymer technique resides in the fact that, in the case of certain polyester prepolymers, it is often difficult and, at times, virtually impossible to produce therefrom, a product which is cellular in nature. This is attributable to the fact that the foam, which commences to form when the particular polyester prepolymer, water and activator are mixed, collapses before the product has had an opportunity to set.

It has been suggested in the art that the blendability of the activator and water with the polyester prepolymer can be improved by the use of a composition, such as, a silicone oil. However, it has been found that, while a silicone oil does, in fact, assist in the blending of the reactants and the catalyst and will, to some extent, prevent foam collapse, the cellular structure of the foamed product produced in the presence of such a composition leaves very much to be desired. Foamed products prepared in the presence of an additive of this type are characterized, generally, by large size and irregularly shaped cells. To be completely satisfactory for use, therefore, a proposed blending agent must not only facilitate the blending of the reactants but also it must actively assist in building and maintaining a satisfactory cell structure.

It is the object of this invention to provide a new and improved process for producing flexible urethane foams.

It is a more particular object of the invention to provide a new and improved method for facilitating the production, from polyester prepolymers, of low density flexible foams having very many small and substantially uniform cells.

Other objects of the invention will be obvious and will in part appear hereinafter.

It has been discovered that polyester prepolymers will blend readily with water and an activator or catalyst, and that the formation of flexible urethane foams of substantially uniform cellular structure will be greatly facilitated, when the blending of the ingredients is carried out in the presence of a compound selected from the group consisting of trialkyl phosphates, trialkyl borates, and trialkyl phosphites.

The polyester prepolymers, which are used in the practice of the invention, are prepared ordinarily by first charging the polyester resin and polyisocyanate reactants into a suitable reaction vessel. The reactants should be substantially free of water. As the reactants are admixed, an immediate, but relatively small, rise in the temperature of the reaction mixture will be noted. The mixture is heated, with stirring, in the presence of inert atmosphere to a temperature of about 200° F. and maintained at that temperature for a period of from about two hours to about three hours until the prepolymer has been formed.

The aforesaid procedure represents a typical procedure for producing the prepolymers. It should be understood, however, that the preparation of the prepolymer is not a part of the present invention and that, hence, the utility of the prepolymer for the purposes of this invention is not at all dependent upon its method of preparation. In general, any polyester prepolymer which is suitable for use in the production of flexible urethane foams can be employed in carrying out the invention.

As will be quite obvious to those skilled in the art, the polyester used in producing the prepolymer will determine whether a flexible foam or a rigid foam will be obtained when that prepolymer is foamed. In general, the use of a substantially branched chain polyester resin will result in the production of a foamed plastic product which is rigid in nature. These polyesters, produced, for example, by reacting a triol, such as, trimethylolpropane with adipic acid are characterized by their branched chain structure. Flexible foamed plastic products, on the other hand, are produced from polyesters which are essentially linear in nature and derived mainly from glycols. Since the present invention is concerned solely with the production of flexible foams, prepolymers produced from polyesters which are substantially linear in nature are employed. Suitable polyesters are prepared, for example, by reacting the substantially linear glycols with polybasic acids, or mixtures thereof, such as, adipic acid, β-methyl adipic acid, azelaic acid, fumaric acid, glutaric acid, maleic acid, malonic acid, sebacic acid, citric acid, etc., or other similar ester-forming compounds, such as, phthalic anhydride, maleic anhydride, etc. Polyhydric alcohols suitable for used in producing the desired polyesters include ethylene glycol, diethylene glycol, triethylene glycol, trimethylene glycol, pentamethylene glycol, hexamethylene glycol, propylene glycol, 1,2-propylene glycol, 1,3-propylene glycol, 1,4-butylene glycol, butandiol-1,2 butandiol-1,3, butandiol-1,4, butandiol-2,3, hexandiol-1,4, pentandiol-1,5, heptandiol-1,7 etc. Mixtures of such glycols either with each other, or with relatively minor quantities of branched chained polhydric alcohols, such, as trimethylol ethane, trimethylol propane, etc. can also be employed in producing the polyester. Typical formulas for polyesters that can be, and have been, used in the production of polyester prepolymers are as follows:

FORMULA A

| | Mols |
|---|---|
| Diethylene glycol | 2.074 |
| Trimethylol propane | 0.074 |
| Adipic acid | 2.0 |

FORMULA B

| | |
|---|---|
| Diethylene glycol | 2.13 |
| Trimethylol ethane | 0.063 |
| Adipic acid | 2.0 |

FORMULA C

| | |
|---|---|
| Diethylene glycol | 2.13 |
| Trimethylol propane | 0.063 |
| Adipic acid | 2.0 |

FORMULA D

| | |
|---|---|
| Diethylene glycol | 2.13 |
| Trimethylol ethane | 0.126 |
| Adipic acid | 2.0 |

The method employed in producing the polyester is not a part of, and, hence, does not limit the scope of the invention. In general, polyester compositions fully suited for use can be prepared by the well known procedures of the art. However, although certain variations therein will be quite obvious to those skilled in the art, prepolymers produced from polyesters having a hydroxyl number within the range of from about 40 to 80 and a relatively low acid value are preferably employed in the practice of the invention.

As indicated heretofore, the prepolymers used in the practice of the invention are prepared by reacting the polyester with a polyisocyanate compound, that is, a composition containing more than one isocyanate group. In general, any polyisocyanate can be employed in the production of these prepolymers. Thus, for example, trimethylene diisocyanate, tetramethylene diisocyanate, pentamethylene diisocyanate, hexamethylene diisocyanate, toluene - 2,4 - diisocyanate, toluene - 2,6 - diisocyanate, m-phenylene diisocyanate, p-phenylene diisocyanate, triphenyl diisocyanate, ethylene diisocyanate, propylene-1,2-diisocyanate, diphenylmethane diisocyanate, triphenylmethane diisocyanate, etc., and mixtures thereof, can be employed in producing the prepolymer.

The ratio of polyisocyanate compound to polyester resin that is used in the production of the prepolymers used in the practice of this invention will vary. In general, polyester prepolymers prepared by reacting such quantities of polyisocyanate and polyester as to provide the reaction mixture with a ratio of isocyanate groups to hydroxyl groups of 1.05 (NCO): 1(OH) to 6(NCO): 1(OH) will be used. Preferably, however, polyester prepolymers prepared from polyisocyanate-polyester reaction mixtures in which the ratio of isocyanate groups of hydroxyl groups is from 3(NCO): 1(OH) to 5(NCO): 1(OH) will be employed.

As indicated heretofore, in the prepolymer technique a foamed product is obtained by blending the prepolymer with water and an activator. It has been found that, when the blending is carried out in the presence of trialkyl phosphates, trialkyl borates, trialkyl phosphites, or mixtures thereof, not only will the blendability of the ingredients be improved but also that the foamability of the reaction mixture and, hence, the cellular structure of the product will be improved also. In general, any trialkyl phosphate, borate or phosphite can be used. Preferably, however, trialkyl compounds, the alkyl groups of which comprise from about 2 to about 12 carbon atoms are employed. Thus, for example, triethyl phosphate, tributyl phosphate, trioctyl phosphate, tributoxyethyl phosphate, tri-n-hexyl borate, tri-n-dodecyl borate, tributyl phosphite, tri-n-hexyl phosphite, etc. and mixtures thereof can be employed.

The invention is particularly noteworthy in that one need only use a relatively small quantity of phosphate, borate, or phosphite additive. The presence of as little as about 0.1% by weight of additive, based on the weight of the prepolymer, in the foam formulation has been found to be quite effective. In most instances, however, at least 0.2% by weight of additive based on the weight of the prepolymer, will be used. Obviously, less than about 0.1% by weight of additive could be used in the practice of the invention. However, when such lesser quantities are employed, the blending of the ingredients of the reaction mixture becomes increasingly more difficult and foamed products having somewhat inferior cell structure will be obtained. When certain polyester prepolymers are in use it may be impossible to obtain a cellular product if lesser quantities of additive are used. In such instances the foam collapses before the cells have had an opportunity to set. Furthermore, while quantities in excess of 0.2% by weight of additive will often be used, seldom, if ever, will there be any practical advantage in using more than about 3.0% by weight thereof.

The manner in which the trialkyl phosphate, borate, or phosphite additive is incorporated into the reaction system is not critical. Where it is desired to produce a foamed product from the polyester prepolymer immediately, the additive, water and the activator can be added in that sequence, or in any other sequence, to the prepolymer in a suitable reaction vessel. However, if desired, the additive, water and activator can be mixed first in a suitable vessel and the mixture thus obtained added to, and mixed with, the prepolymer. Where, however, the prepolymer, is not to be used immediately, the phosphate, borate, or phosphite additive can be incorporated into the prepolymer in the absence of water and activator and stored for later use. Water and activator can be added subsequently to the additive-containing prepolymer to produce the desired foam. It has been found that storage of an additive-containing prepolymer, even for relatively long periods of time, will have no adverse effect upon the properties of the foamed products produced therefrom.

The present invention is of particular significance since its operability is not influenced, to any great extent, by the identity of the particular activator in use. For the most part, the invention can be utilized when any of the activators commonly used in this art are employed. Such activators are, among others, n-methyl morpholine, n-ethyl morpholine, and other alkyl morpholines, dimethyl amino dodecanol, trimethyl amine, triethyl amine, dimethyl hexahydroaniline and derivatives of piperazine. In addition, the invention can be carried out in the presence of commercially available activators, such as, "Caytur Da" and "Caytur O," both of which are products of E. I. du Pont de Nemours and Co., Wilmington, Delaware. The quantity of activator used in producing the foamed product does not limit the scope of the invention. Generally, however, from about 0.5% to about 5.0% by weight of activator, based on the weight of prepolymer, will be employed in producing the foamed product.

Several advantages adhere in the practice of the present invention. In the first place, it facilitates greatly the production of valuable urethane foams from polyester prepolymers. It eliminates entirely the problems which attended the prior art attempts at blending the reactants. Moreover, the practice of the invention greatly minimizes the possibility that foam collapse will occur before the reaction is completed. Thus, to a great extent it insures the production of a product having the distinctive urethane cell structure. In addition to these advantages, however, the presence of these additives in the reaction system has been found to have a more positive effect upon the properties of the foamed products produced. For example, a majority of the products which are produced as disclosed herein will be made up of a very large number of relatively small cells which are substantially uniform in both size and shape. Also, the density of the foamed products produced can be regulated, to some extent, by the choice of the additive to be used. Experimental work carried out in this connection indicates that the use of an additive having longer carbon chain alkyl substituents will tend to produce a lower density foam than will the use of an additive having shorter carbon chain alkyl groups. Furthermore, in addition to the foregoing features, foams of increased softness can be obtained by the use of the phosphate, borate, and phosphite compounds as disclosed herein. It has been observed that foams of increased softness can be obtained by increasing the quantities of trialkyl phosphate, borate or phosphite compound employed.

For a fuller understanding of the nature and objects of this invention, reference may be had to the following examples which are given merely as further illustrations of the invention and are not to be construed in a limiting sense. All parts given in the examples are parts by weight unless otherwise indicated.

Example I

In this example, four samples of a polyester prepolymer were placed in separate reaction vessels. Each sample weighed 50.0 grams. To the first reaction vessel, 0.1 gram of tributyl phosphate was added. To the second, 0.25 gram of tributyl phosphate was added. To the third, 0.5 gram of tributyl phosphate was added. To the fourth, 1.0 gram of tributyl phosphate was added. The polyester prepolymer employed was prepared by heating, at a temperature of about 200° F. for a period of about three hours, 30.0 parts of Paraplex U-148 (a polyester resin, having a hydroxyl number of about 70 at an acid value of about 1.0, an average molecular weight (Ebulliometric) of about 1800-2000, an equivalent weight of about 745-830 and a maximum water content of 0.25 percent produced by Rohm & Haas & Co., Philadelphia, Pa.), and 14.1 parts of Hylene TM (an organic polyisocyanate, manufactured by E. I. du Pont de Nemours and Co., Wilmington, Delaware).

To each of these four reaction vessels, 0.5 gram of n-methyl morpholine and 1.2 grams of water was added. Each mixture was hand mixed for a period of about 30 seconds. In each case, excellent blending of the additive-containing polyester prepolymer with water and the activator was noted.

For comparative purposes, two additional samples of the polyester prepolymer, each sample weighing 50.0 grams were placed in separate reaction vessels. To one of these only, 0.1 gram of silicone oil was added. Thereafter, 0.5 gram of n-methyl morpholine and 1.2 gram of water was added to both reaction vessels.

The blendability of the reactants in the system containing silicone oil was relatively good but it was inferior to the systems containing tributyl phosphate. The blendability of the reactants in the system which did not contain silicone oil was poor.

A flexible foam having a density in excess of 5 pounds per cubic foot was obtained from the silicone oil-containing reaction mixture. The foamed product was characterized by its large cells. A flexible foam, having a density of 3.9 pounds per cubic foot, was obtained from the system which contained no silicone oil. This foam was characterized by the stiff feel and by the irregularity of its cellular structure.

A flexible foam was obtained in each case in which tributyl phosphate was employed. In contrast to the products of the control experiments, each product was composed of a very large number of fine cells which were substantially uniform in size and in shape. The product produced using 1.0 gram of tributyl phosphate had a density of 3.5 pounds per cubic foot whereas each of the other products had a density of 3.6 pounds per cubic foot.

It was observed further that there was a correlation between the quantity of additive employed and the softness of the foamed product. As the amount of trialkyl phosphate additive employed was increased, a foam of increased softness was obtained.

Example II

The procedure of Example I was repeated, except that triethyl phosphate and trioctyl phosphate were employed in place of the tributyl phosphate employed therein. The prepolymer used in Example I was employed in carrying out this example.

To one sample of polyester prepolymer, weighing 50.0 grams, 0.4 gram of triethyl phosphate was added and to a second sample of polyester prepolymer, also weighing 50.0 grams, 1.0 gram of triethyl phosphate was added. A third 50.0 gram sample, without additive, was employed for control purposes.

Trioctyl phosphate was added to five other 50.0 samples of polyester prepolymer, in quantities of 0.1 gram, 0.2 gram, 0.3 gram, 0.5 gram and 1.0 gram, respectively. A sixth 50.0 gram sample, without additive, was employed for control purposes.

Each of the two triethyl phosphate-containing samples were hand mixed with 1.2 grams of water and 0.5 gram of n-methyl morpholine, for about 35 seconds. Each of the five trioctyl phosphate containing samples were hand mixed with 1.2 grams of water and 0.5 gram of n-methyl morpholine, for about 30 seconds. In each case, the blending of the water and activator with the prepolymer was good. Each of the additive-free control samples were hand mixed with 1.2 grams of water and 0.5 gram of n-methyl morpholine. Blending of the reactants in the control experiments was poor.

Flexible foams were obtained in each instance. The foam obtained using 0.4 gram triethyl phosphate had a density of 4.0 pounds per cubic foot whereas the foam obtained using 1.0 gram of triethyl phosphate had a density of 3.6 pounds per cubic foot. These products were more resilient than the products obtained in Example I where tributyl phosphate was employed.

The foamed products obtained using 0.1 gram, 0.2 gram, 0.3 gram, 0.5 gram and 1.0 gram of trioctyl phosphate as the additive had densities of 3.5, 3.3, 3.3, 3.4, and 3.4 pounds per cubic foot, respectively. These products were less resilient than those produced using triethyl phosphate as the additive.

All eight of the foamed products produced in this example using trialkyl phosphate additives were composed of a very large number of fine cells which were substantially uniform in size and shape. The control samples which were produced in the absence of an additive were flexible but had a stiff feel. They were composed of irregular size cells.

Example III

In this example, 0.2 gram of tributyl phosphite was added to, and mixed with, 50 grams of polyester prepolymer. The prepolymer used in this example was the same as that employed in Example I. To this mixture, 1.2 grams of water and 0.5 gram of n-methyl morpholine were added. The reaction mixture was hand mixed. The reactants and activator blended together very easily.

A flexible urethane foam, having very many small cells which were substantially uniform in size and shape, was obtained. It was determined that this foam had a density of 4.1 pounds per cubic foot. A sample of the same polyester prepolymer was foamed without using the additive. The blendability of water and activator with the prepolymer was poor and a flexible product having a stiff feel and irregular size cells was obtained.

To demonstrate the effect that the carbon chain length of the alkyl substituents of the additive has upon the foam density, the above procedure was repeated in every detail using however, 0.2 gram of tri-n-hexyl phosphite instead of 0.2 gram of tributyl phosphite. As was the case heretofore, the reactants and activator blended readily. A flexible urethane foam, composed of a very large number of small cells which were substantially uniform in size and shape, was once again obtained. This foamed product, however, was determined to have had a density of 3.5 pounds per cubic foot.

*Example IV*

In this example, 0.2 gram of tri-n-hexyl borate was added to, and mixed with, 50.0 grams of polyester prepolymer. The prepolymer used in this example was the same as the prepolymer employed in Example I. To another 50 gram sample of the same polyester prepolymer, 0.2 gram of tri-n-dodecyl borate was added.

To each of these, 1.2 grams of water and 0.5 gram of n-methyl morpholine were added. The reaction mixtures were hand mixed. The blendability of the reactants and activator in the presence of the borate compounds was superior to the blendability of those same ingredients in the absence of an additive.

Flexible urethane foams were obtained. These foams were composed of a very large number of fine cells which were substantially uniform in size and in shape. The product obtained using tri-n-hexyl borate as the additive had a density of 4.0 pounds per cubic foot and the product obtained using tri-n-dodecyl borate as the additive had a density of 3.7 pounds per cubic foot.

From a control sample of 50.0 grams of prepolymer, foamed by hand mixing, in the absence of an additive, 1.2 grams of water and 0.5 gram of n-methyl morpholine, there was obtained a flexible foam having a cellular structure composed of large and irregularly shaped cells.

*Example V*

In this example, samples of a polyester prepolymer, each weighing 100.0 grams, were placed in each of four reaction vessels. To one of these, 1.0 gram of tributyl phosphate was added. To the second, 0.6 gram of tri-octyl phosphate was added. To the third, 1.0 gram of tributoxyethyl phosphate was added. No additive was incorporated into the fourth reaction vessel since this was to be used for control and comparative purposes. The polyester prepolymer used in this example was produced by heating at a temperature of about 200° F. for a period of about three hours, 69.6 parts of Multron R–68 (a polyester resin which is an adipic acid ester of diethylene glycol modified with a triol produced and sold by Mobay Chemical Company, St. Louis, Missouri having a hydroxyl value of about 52.5 at an acid value of about 1.0) with 30.4 parts of Hylene TM.

To each of these four reaction vessels 2.4 grams of water and 1.0 gram of n-methyl morpholine was added. Each reaction mixture was stirred by hand for a period of about 30 seconds. Blending of the activator and water with the prepolymer was greatly facilitated by the use of these phosphate additives.

The product obtained in the absence of an additive was entirely unsatisfactory, since the foam which commenced to form when the prepolymer, water and activator were mixed collapsed during the reaction. The collapse of the foam indicates the necessity of using an additive when this prepolymer is in use.

Where tributyl phosphate was employed as the additive, a flexible foam was obtained which was characterized by the presence of a very large number of small cells which were substantially uniform in both size and in shape. The foam was resilient.

Where trioctyl phosphate was the additive employed, a flexible foam was obtained which was characterized by the presence of a very large number of small cells which were characterized by the presence of a very large number of small cells which were substantially uniform both in size and in shape. This product was also resilient. However, the product was softer than the product obtained using tributyl phosphate as the additive.

A flexible cellular product was obtained when tributyloxyethyl phosphate was employed as the additive. The cells of this product were, however, somewhat larger than the cells of the foamed products obtained in the presence of the other phosphate additives.

The foamed products obtained using tributyl phosphate and trioctyl phosphate each had densities of 3.5 pounds per cubic foot, whereas, the product obtained using tributoxyethyl phosphate as the additive had a density of 4.0 pounds per cubic foot.

*Example VI*

To demonstrate the operability of the invention where activators other than n-methyl morpholine are employed, the following experimental work was carried out.

0.7 gram of Caytur DA (a delayed action activator which is β-morpholinopropionamide manufactured and sold by E. I. du Pont de Nemours and Co., Wilmington, Delaware) and 1.2 grams of water were added to, and mixed with, 50.0 grams of the polyester prepolymer of Example I. The prepolymer had had 0.5 gram of tributyl phosphate previously incorporated therein. The reactants blended very readily. A flexible foam having a density of 4.0 pounds per cubic foot was obtained. This foamed product was characterized by a very large number of small cells which were substantially uniform in size and in shape.

0.5 gram of Caytur O (an odorless activator which is β-dimethylaminopropionamide manufactured and sold by E. I. du Pont de Nemours and Co., Wilmington, Delaware) and 1.2 gram of water were incorporated into 50 grams of the prepolymer resin of Example I which contained 0.5 gram of tributyl phosphate. Blending of the reactants was greatly facilitated by the presence of the additive. A flexible foam having a density of 3.2 pounds per cubic foot was obtained. The cellular structure of this foamed product was superior to the cellular structure of the foamed product produced from the same prepolymer in the absence of the additive.

Having described my invention what I claim as new and desire to secure by Letters Patent is:

1. A flexible urethane foam produced by mixing a polyester prepolymer with water and an activator therefor in the presence of from about 0.1% to about 3.0% based upon the weight of said prepolymer, of at least one compound selected from the group consisting of trialkyl phosphates, trialkyl borates, and trialkyl phosphites in which said alkyl substituent contains from about 2 to 12 carbon atoms, said polyester prepolymer being the reaction product of an organic polyisocyanate and a polyester which is the reaction product of a mixture of at least one dihydric alcohol, at least one dicarboxylic acid and up to minor quantities of at least one polyhydric alcohol containing at least three hydroxyl groups, said polyester having a hydroxyl number between about 40 to 80 and a relatively low acid number, said polyisocyanate and polyester being present in such quantities to provide the polyisocyanate-polyester reaction product with a ratio of isocyanate groups to hydroxyl groups of 1.05 (NCO):1(OH) to 6(NCO):1(OH).

2. The flexible urethane foam of claim 1 in which said polyester contains at least one dicarboxylic acid, at least one dihydric alcohol and minor quantities of at least one polyhydric alcohol containing at least three hydroxyl groups.

3. The flexible urethane foam of claim 1 in which said activator is n-methyl morpholine and said ratio of isocyanate groups to hydroxyl groups is from 3(NCO):1(OH) to 5(NCO):1(OH).

4. The composition of claim 3 wherein tributyl phosphate is employed.

5. The composition of claim 3 wherein triethyl phosphate is employed.

6. The composition of claim 3 wherein trioctyl phosphate is employed.

7. The composition of claim 3 wherein tributyl phosphite is employed.

8. The composition of claim 3 wherein tri-n-hexyl phosphite is employed.

9. A composition comprising a polyester prepolymer which is the reaction product of an organic polyisocyanate and a polyester which is the reaction product of a mixture of at least one dihydric alcohol, at least one dicarboxylic acid and up to minor quantities of at least one polyhydric alcohol containing at least three hydroxyl groups, said polyester having a hydroxyl number between about 40 to 80 and a relatively low acid number, said polyisocyanate and polyester being present in such quantities to provide the polyisocyanate-polyester reaction product with a ratio of isocyanate groups to hydroxyl groups of 1.05 (NCO):1(OH) to 6(NCO):1(OH) and from about 0.1% to about 3.0% based on the weight of said prepolymer of at least one compound selected from the group consisting of trialkyl phosphates, trialkyl phosphites and trialkyl borates in which said alkyl substituent contains from about 2 to 12 carbon atoms.

10. The composition of claim 9 in which said polyester contains at least one dicarboxylic acid, at least one dihydric alcohol and minor quantities of at least one polyhydric alcohol having at least three hydroxyl groups.

11. The composition of claim 10 in which said trialkyl phosphate is tributyl phosphate.

12. The composition of claim 10 in which said trialkyl phosphate is triethyl phosphate.

13. The composition of claim 10 in which said trialkyl phosphate is trioctyl phosphate.

14. The composition of claim 10 in which said trialkyl phosphite is tributyl phosphite.

15. The composition of claim 10 in which said trialkyl phosphite is tri-n-hexyl phosphite.

16. In a process for producing flexible urethane foams by mixing a polyester prepolymer with water and an activator therefor, and thereafter allowing the resulting reaction mixture to react and foam thereby forming flexible urethane foam, said polyester prepolymer being the reaction product of an organic polyisocyanate and a polyester which is the reaction product of a mixture of at least one dihydric alcohol, at least one dicarboxylic acid and up to minor quantities of at least one polyhydric alcohol containing at least three hydroxyl groups, said polyester having a hydroxyl number between about 40 to 80 and a relatively low acid number, said polyisocyanate and polyester being present in such quantities to provide the polyisocyanate-polyester reaction product with a ratio of isocyanate groups to hydroxyl groups of 1.05(NCO):1(OH) to 6(NCO):1(OH), the step which comprises mixing said ingredients in the presence of from about 0.1% to about 3.0% based on the weight of said prepolymer of at least one compound selected from the group consisting of trialkyl phosphates, trialkyl phosphites, and trialkyl borates, said alkyl substituents containing from about 2 to 12 carbon atoms.

17. The process of claim 16 in which said polyester contains at least one dicarboxylic acid, at least one dihydric alcohol and minor quantities of at least one polyhydric alcohol and minor quantities of at least one polyhydric alcohol having at least three hydroxyl groups.

18. The process of claim 16 in which said activator is n-methyl morpholine and said ratio of isocyanate groups to hydroxyl groups is from 3(NCO):1(OH to

5(NCO):1(OH)

19. The process of claim 17 in which said trialkyl phosphate is tributyl phosphate.

20. The process of claim 17 in which said trialkyl phosphate is triethyl phosphate.

21. The process of claim 17 in which said trialkyl phosphate is trioctyl phosphate.

22. The process of claim 17 is which said trialkyl phosphite is tributyl phosphite.

23. The process of claim 17 in which said trialkyl phosphite is tri-n-hexyl phosphite.

References Cited in the file of this patent
UNITED STATES PATENTS

| | | |
|---|---|---|
| 2,764,565 | Hoppe et al. | Sept. 25, 1956 |
| 2,811,493 | Simon et al. | Oct. 29, 1957 |